United States Patent [19]

Kojo et al.

[11] Patent Number: 4,530,947
[45] Date of Patent: Jul. 23, 1985

[54] ANTICORROSIVE COATING COMPOSITION

[75] Inventors: Hidehiko Kojo, Koshigaya; Koji Akimoto, Tokyo, both of Japan

[73] Assignee: Asahi Denka Kogyo K.K., Tokyo, Japan

[21] Appl. No.: 603,396

[22] Filed: Apr. 24, 1984

[51] Int. Cl.³ .................... C08L 63/00; C08L 95/00
[52] U.S. Cl. .................... 523/450; 525/54.5
[58] Field of Search ............ 523/450, 455, 463, 464; 525/54.5

[56] References Cited

U.S. PATENT DOCUMENTS 3,615,801 10/1971 Marklow et al. .............. 523/450
3,846,442 11/1974 Habermeier et al. ........... 523/450

FOREIGN PATENT DOCUMENTS 666905 7/1963 Canada ........................ 523/450
49-92125 9/1974 Japan ......................... 523/450

Primary Examiner—Allan M. Lieberman
Attorney, Agent, or Firm—Flynn, Thiel, Boutell & Tanis

[57] ABSTRACT

A coating composition which comprises
(A) a polyol resin obtained by the reaction of a prepolymer of epoxy resin and polyhydroxy penolic compound such as
  (i) poly-nuclear polyhydroxy phenols having adjacent hydroxy groups
  (ii) polyol esters of polyhydroxy phenolic carboxylic acids having adjacent hydroxy groups, and
  (iii) a mixture thereof, and one or more compound having one or more amino groups reactive with epoxy group;
(B) a compound having more than one isocyanate group or groups which change to isocyanate groups under hardening condition, and
(C) a bituminous material and/or its substitute.

This coating composition can be coated on rusty metal surfaces.

8 Claims, No Drawings

ANTICORROSIVE COATING COMPOSITION

BACKGROUND OF THE INVENTION

1. Field of the Invention

The present invention relates to a coating composition and more particularly, a superior anticorrosive coating composition for metals containing a chelatable polyol resin, a hardener containing isocyanate group and bituminous material.

2. Description of the Prior Art

A coating composition containing polyol resin is known as an anticorrosive coating composition for metal. However, in order to show and keep good anticorrosive properties, it is necessary to remove the rust and to conduct sufficient treatment of the metal surface, before the application of the coating, up to the grade of St (or Sa) 2.5 of Swedish Standard SIS 05 59 00. If the metal surface is treated insufficiently, the coating shows less adherence and poorer anticorrosive properties.

It was desired to obtain a good coating composition showing good adherence and good anticorrosive properties when it was coated on a poorly treated metal surface or even on a rusty surface such as the grade of Sa 1 to Sa 1.5 of Swedish Standard SIS 05 59 00.

SUMMARY OF THE INVENTION

Accordingly, an object of the present invention is to provide a good coating composition showing good adherence and good anticorrosive properties when coated on a poorly treated metal surface or even on a rusty surface of SIS Sa 1 to 1.5. The coating composition of the present invention contains as essential components;

(A) a polyol resin obtained by the reaction of (I) an epoxy group-containing prepolymer prepared by reacting epoxy resin (A-1) and a polyhydroxy phenolic compound (A-2) such as:
  (i) polynuclear polyhydroxy phenols having adjacent hydroxy groups (A-2-1),
  (ii) polyol esters of polyhydroxy phenolic carboxylic acid having adjacent hydroxy groups (A-2-2) and
  (iii) a mixture of (i) and (ii); with (II) one or more compounds (A-3) having one or more amino groups reactive with said epoxy group;
(B) a compound having more than one isocyanate group or groups which change to isocyanate groups under the hardening condition, and
(C) a bituminous material and/or its substitute.

The prepolymer used in the present invention is obtained by the reaction, under heating, of epoxy resin (A-1) and polynuclear polyhydroxy phenols having adjacent hydroxy groups (A-2-1) and/or polyol esters of polyhydroxy phenolic carboxylic acids having adjacent hydroxy groups (A-2-2), optionally in the presence of a solvent and/or a catalyst, in such a ratio that epoxide groups remain in the prepolymer.

While the reaction temperature is not limited, it is lower than the decomposition temperature of the epoxy resin and it is high enough to finish the reaction within a proper time. Usually, the reaction proceeds at 100°–200° C.

When a catalyst is used, tertiary amines, ammonium salts, phosphonium salts, amine hydrochloride salts etc. can be used.

DETAILED DESCRIPTION OF THE INVENTION

The epoxy resins (A-1) which can be used in this invention include, for example, an epoxy compound which contains on the average more than one 1,2-epoxy group (preferably an epoxy compound which contains on the average 2 or more groups), epoxidized polyunsaturated compounds and other well known epoxy compounds which contain an adjacent epoxy group.

The epoxy resin (A-1) which may be used in the compositions of this invention includes, for example, epoxy compounds (A-1-1) containing on the average more than one substituted glycidyl ether group which is represented by the general formula:

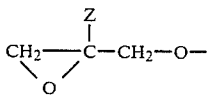

(wherein Z represents a hydrogen atom, a methyl group or an ethyl group) per molecule; epoxy compounds (A-1-2) containing on the average more than one substituted or nonsubstituted glycidyl ester group which is represented by the general formula:

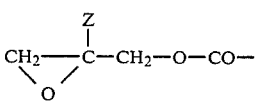

(wherein Z represents a hydrogen atom, a methyl group or an ethyl group) per molecule; and epoxy compounds (A-1-3) containing on the average more than one substituted or nonsubstituted N-substituted glycidyl group which is represented by the general formula:

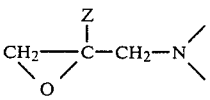

(wherein Z represents a hydrogen atom, a methyl group or an ethyl group) per molecule.

Said epoxy compounds (A-1-1) containing on the average more than one substituted or nonsubstituted glycidyl ether group per molecule may be prepared by glycidyletherifying hydroxy compounds such as phenolic hydroxyl compounds or alcoholic hydroxyl compounds.

Examples of the preferable epoxy compounds (A-1-1) include, for example, polyglycidyl ethers (A-1-1-1) of polyhydric phenols containing one or more aromatic nuclei, polyglycidyl ethers (A-1-1-2) of alcoholic polyhydroxyl compounds derived by the addition reaction of polyhydric phenols containing one or more aromatic nuclei with alkylene oxides containing 2 to 4 carbon atoms, and polyglycidyl ethers (A-1-1-3) of alcoholic polyhydroxyl compounds containing one or more alicyclic rings.

Said polyhydric phenol polyglycidyl ethers (A-1-1-1) include, for example, epoxide compounds containing, as the main reaction product, (1) polyglycidyl ethers obtained by reacting polyhydric phenols (D) containing at least one aromatic nucleus with epihalohydrins (e) in the presence of basic catalysts or basic compounds, such as sodium hydroxide, (2) epoxide compounds obtained by reacting polyhalohydrin ethers, obtained by reacting polyhydric phenols (D) containing at least one aromatic nucleus with epihalohydrins (e) in the presence of catalytic amounts of acid catalysts such as boron trifluoride, with basic compounds such as sodium hydroxide, and (3) epoxide compounds obtained by reacting polyhalohydrin ethers, obtained by reacting polyhydric phenols (D) containing at least one aromatic nucleus with epihalohydrins (e) in the presence of catalytic amounts of basic catalysts such as triethyl amine, with basic compounds such as sodium hydroxide.

Such polyoxyalkylated polyhydric phenol polyglycidyl ethers (A-1-1-2) include, for example, epoxide compounds containing, as the main reaction product, polyglycidyl ethers obtained by reacting polyhalohydrin ethers, obtained by reacting polyoxyalkylated polyhydric phenols (E) derived by the addition reaction of polyhydric phenols containing at least one aromatic nucleus with alkylene oxides containing 2 to 4 carbon atoms, with epihalohydrins (e) in the presence of a catalytic amount of acid catalyst such as boron trifluoride, with basic compounds such as sodium hydroxide.

Said polyhydric phenols containing at least one aromatic nucleus (D) include polyhydric mononuclear phenols containing one aromatic nucleus (D-1), and polyhydric polynuclear phenols containing at least two aromatic nuclei (D-2).

Illustrative polyhydric mononuclear phenols (D-1) include, for example, resorcinol, hydroquinone, pyrocatechol, phloroglucinol, 1,5-dihydroxy naphthalene, 2,7-dihydroxy naphthalene, 2,6-dihydroxy naphthalene and the like.

Illustrative polyhydric polynuclear phenols (D-2) include dihydric polynuclear phenols having the following general formula (1);

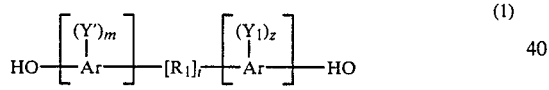
(1)

wherein: Ar is an aromatic divalent hydrocarbon group or radical such as naphthylene and phenylene, with phenylene being preferred for purposes of this invention: $Y'$ and $Y_1$, which can be the same or different, are alkyl groups such as methyl, n-propyl, n-butyl, n-hexyl, n-octyl and the like, preferably alkyl groups having a maximum of 4 carbon atoms, or halogen atoms, i.e., chlorine, bromine, iodine, or fluorine, or alkoxy groups such as methoxy, methoxymethyl, ethoxy, ethoxyethyl, n-butoxy, amyloxy and the like, preferably an alkoxy group having a maximum of 4 carbon atoms (it is to be understood that whenever there are substituents exclusive of the hydroxyl groups on either or both of the aromatic divalent hydrocarbon groups, that these substituents can be the same or different); i is an integer having a value of 0 or 1; m and z are integers having a value of from 0 to a maximum value corresponding to the number of hydrogen atoms on the aromatic ring (Ar) which can be replaced by substituents and can have the same or different values; and $R_1$ is a divalent group or radical, as for example

or —O—, or —S—, or —SO—, or —SO$_2$—, or a divalent hydrocarbon group as, for example, an alkylene group such as methylene, ethylene, trimethylene, tetramethylene, pentamethylene, hexamethylene, 2-ethyl hexamethylene, octamethylene, nonamethylene, decamethylene, and the like, an alkylidene group such as ethylidene, propylidene, isopropylidene, isobutylidene, amylidene, isoamylidene, 1-phenyl ethylidene and the like, or a cycloaliphatic group, such as 1,4-cyclohexylene, 1,3-cyclohexylene, cyclohexylidene and the like, or halogenated alkylidene, alkylene or cycloaliphatic groups, alkoxy and aryloxy substituted alkylidene, alkylene or cycloaliphatic groups, such as methoxy methylene, ethoxy methylene, ethoxy ethylene, 2-ethoxy trimethylene, 3-ethoxy pentamethylene, 1,4-(2-methoxycyclohexane), phenoxy ethylene, 2-phenoxy trimethylene, 1,3-(2-phenoxy cyclohexane), and the like, aralkylene groups, such as phenyl ethylene, 2-phenyl trimethylene, 1-phenyl pentamethylene, 2-phenyl decamethylene, and the like, aromatic groups, such as phenylene, naphthylene, and the like, halogenated aromatic groups, such as 1,4-(2-chlorophenylene), 1,4-(2-bromophenylene), 1,4-(2-fluorophenylene), and the like; alkoxy and aryloxy substituted aromatic groups, such as 1,4-(2-methoxyphenylene), 1,4-(2-ethoxyphenylene), 1,4-(2-n-propoxyphenylene), 1,4-(2-phenoxyphenylene), and the like, alkyl substituted aromatic groups, such as 1,4-(2-methylphenylene), 1,4-(2-ethylphenylene), 1,4-(2-n-propylphenylene), 1,4-(2-n-butylphenylene), 1,4-(2-n-dodecylphenylene) and the like, or $R_1$ can be a ring which is fused to one of the Ar groups as is the case, for example, in the compound having the formula:

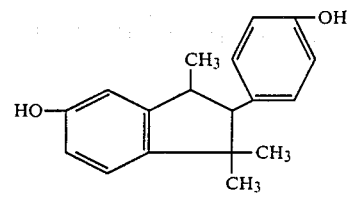

or $R_1$ can be a polyalkoxy group such as polyethoxy, polypropoxy, polythioethoxy, polybutoxy, polyphenylethoxy, or $R_1$ can be a group containing a silicon atom as, for example, polydimethylsiloxy, polydiphenylsiloxy, polymethylphenylsiloxy and the like, or $R_1$ can be two or more alkylene or alkylidene groups separated by an aromatic ring, a tertiary amino group, an ether linkage, a carbonyl group or separated by a linkage containing sulfur such as sulfur, sulfoxide and the like.

Particularly preferred as the dihydric polynuclear phenols are compounds having the general formula:

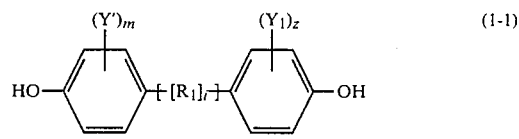
(1-1)

wherein $Y'$, $Y_1$ and i are as previously defined, m and z have values of from 0 to 4 inclusive and $R_1$ is an alkylene or alkylidene group, preferably having from 1 to 3 carbon atoms inclusive, or $R_1$ is a phenylene group having the formula:

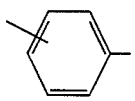

or $R_1$ is a saturated group having the formula:

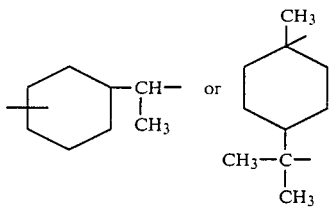

Examples of specific dihydric phenols include among others thebis-(hydroxyphenyl)-alkanes such as 2,2-bis-(p-hydroxyphenyl)-propane, commonly referred to as bisphenol-A, 2,4'-dihydroxy diphenylmethane, bis-(2-hydroxyphenyl)methane, bis-(4-hydroxyphenyl)-methane, bis-4-hydroxy-2,6-dimethyl-3-methoxyphenyl)-methane, 1,1-bis-(4-hydroxyphenyl)ethane, 1,2-bis-(4-hydroxyphenyl)-ethane, 1,1-bis-(4-hydroxy-2-chlorophenyl)-ethane, 1,1-bis-(3,5-dimethyl-4-hydroxyphenyl)ethane, 1,3-bis-(3-methyl-4-hydroxyphenyl)-propane, 2,2-bis-(3-phenyl-4-hydroxyphenyl)-propane, 2,2-bis-(3-isopropyl-4-hydroxyphenyl)-propane, 2,2-bis-(2-isopropyl-4-hydroxyphenyl)propane, 2,2-bis-(4-hydroxynaphthyl)-propane, 2,2-bis-(4-hydroxyphenyl)-pentane, 3,3-bis-(4-hydroxyphenyl)-pentane, 3,3-bis-(4-hydroxyphenyl)-heptane, bis-(4-hydroxyphenyl)-phenylmethane, bis-(4-hydroxyphenyl)-cyclohexylmethane, 1,2-bis-(4-hydroxyphenyl)-1,2-bis-(phenyl)-propane, 2,2-bis-(4-hydroxyphenyl)-1-phenylpropane and the like; dihydroxybiphenyls such as 4,4-dihydroxybiphenyl, 2,2'-dihydroxybiphenyl, 2,4-dihydroxybiphenyl and the like; di(hydroxyphenyl)-sulfones such as bis-(4-hydroxyphenyl)-sulfone, 2,4'-dihydroxydiphenyl sulfone, 5'-chloro-2,4'-di-hydroxydiphenyl sulfone, 5'-chloro-4,4'-dihydroxydiphenyl sulfone, 3'-chloro-4,4'-dihydroxy diphenyl sulfone and the like; di(hydroxyphenyl)-ethers such as bis-(4-hydroxyphenyl)ether, the 4,3'-, 4,2'-, 2,2'-, 2,3'-, dihydroxydiphenyl ethers, 4,4'-dihydroxy-2,6-dimethyldiphenyl ether, bis-(4-hydroxy-3-isobutylphenyl)-ether, bis-(4-hydroxy-3-isopropylphenyl)-ether, bis-(4-hydroxy-3-chlorophenyl)-ether, bis-(4-hydroxy-3-fluorophenyl)-ether, bis-(4-hydroxy-3-bromophenyl)-ether, bis-(4-hydroxynaphthyl)-ether, bis-(4-hydroxy-3-chloronaphthyl)-ether, bis-(2-hydroxybiphenyl)-ether, 4,4'-dihydroxy-2,6-dimethoxydiphenyl ether, 4,4'-dihydroxy-2,5-diethoxydiphenyl ether, and the like; also suitable are 1,1-bis-(4-hydroxyphenyl)-2-phenylethane, 1,3,3'-trimethyl-1-(4-hydroxyphenyl)-6-hydroxyindane, 2,4-bis-(p-hydroxyphenyl)-4-methylpentane and the like.

Other examples of dihydric dinuclear phenols are biphenols such as 4,4'-dihydroxy biphenyl, 3-methyl-4,4'-dihydroxy biphenyl, octachloro-4,4'-dihydroxy biphenyl and the like.

Also preferred are other dihydric polynuclear phenols having the general formula:

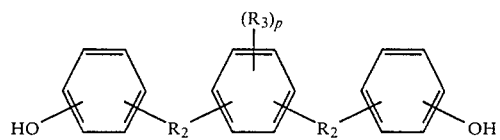

wherein $R_3$ is a methyl or ethyl group, $R_2$ is an alkylidene or other alkylene having from 1 to 9 carbon atoms, and p ranges from zero to 4. Examples of dihydric polynuclear phenols having the formula (1-2) include 1,4-bis-(4-hydroxybenzyl)-benzene, 1,4-bis-(4-hydroxybenzyl)tetramethylbenzene, 1,4-bis-(4-hydroxybenzyl)-tetraethylbenzene, 1,4-bis-(p-hydroxycumyl)-benzene, 1,3-bis-(p-hydroxycumyl)-benzene and the like.

Other examples of polyhydric polynuclear phenols (D-2) include, for example, pre-condensation products of phenols with carbonyl compounds, (for example, pre-condensation products of phenol resin, condensation products of phenols with acroleins, condensation products of phenols with glyoxal, condensation products of phenols with pentanediol, condensation products of resorcinols with acetone, and pre-condensation products of xylenes-phenols with formalin), and condensation products of phenols with polychloromethylated aromatic compounds (for example, condensation products of phenols with bischloromethylxylene).

The polyoxyalkylated polyhydric phenols (E) are compounds which are obtained by reacting the above-mentioned polyhydric phenols (D) having at least one aromatic nucleus with an alkylene oxide in the presence of such catalysts as will accelerate the reaction of the OH group and the epoxy group and which has atomic groups of —ROH (wherein R is an alkylene group derived from an alkylene oxide) and/or —(RO)$_n$H (wherein R is an alkylene group derived from an alkylene oxide, one polyoxyalkylene chain may contain different alkylene groups and n is an integer of 2 or more indicating the number of polymerized oxyalkylene groups) bonded with said phenol residue by an ether bond. In this case, the ratio of alkylene oxide to said polyhydric phenol (D) is made more than 1:1 (mol:mol). But, preferably, the ratio of the alkylene oxide to the OH group of said polyhydric phenol (D) is 1 to 10:1 or particularly 1 to 3:1 by equivalents.

Said alkylene oxides include, for example, ethylene oxide, propylene oxide and butylene oxide, and particularly preferred are those which will bring forth branched chains in the case of producing ether linkages by their reaction with polyhydric phenols. Preferable examples thereof include propylene oxide and 2,3-butylene oxide, and a particularly preferable example thereof is propylene oxide.

Particularly preferred among the polyoxyalkylated polyhydric phenols (E) are those having the following general formula:

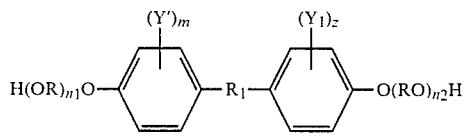

wherein Y', $Y_1$, m, z and $R_1$ have the same significance as defined for the general formula (1-1), R is an alkylene group containing 2 to 4 carbon atoms, and $n_1$ and $n_2$ range from 1 to 3.

In addition, preferred among the polyoxyalkylated polyhydric phenols (E) are those having the following general formula:

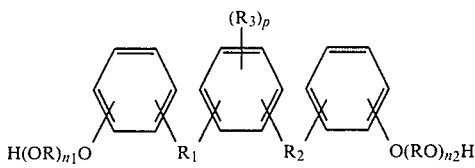

wherein $R_1$, $R_2$, $R_3$, and p have the same significance as defined for the general formulas (1-1) and (1-2), R is an alkylene group containing 2 to 4 carbon atoms, and $n_1$ and $n_2$ range from 1 to 3.

Further, as epoxy compounds (A-1-2) having an average of more than one substituted or nonsubstituted glycidyl ester group in the molecule, there are polyglycidyl esters of aliphatic polycarboxylic acids or aromatic polycarboxylic acids. For example, there is included an epoxy resin such as is obtained by polymerizing glycidyl methacrylate synthesized from an epihalohydrin (e) represented by the below-mentioned general formula (4) and methacrylic acid.

Further, as examples of epoxy compounds (A-1-3) having an average of more than one substituted or nonsubstituted N-substituted glycidyl group in the molecule, there can be enumerated epoxy resins obtained from aromatic amines (for example, aniline or aniline having alkyl substituent(s) in the nucleus) and epihalohydrins (e) represented by the below-mentioned general formula (4) and epoxy resins obtained from precondensates of aromatic amines and aldehydes (for example, aniline-formaldehyde precondensates or aniline-phenol-formaldehyde precondensates) and epihalohydrins (e).

Said polyhydric alicyclic alcohol polyglycidyl ethers (A-1-1-3) include, for example, epoxide compounds containing, as the main reaction product, polyglycidyl ethers obtained by reacting polyhydric alcohols (F) containing at least one alicyclic ring with epihalohydrins (e) in the presence of basic catalysts or basic compounds, such as sodium hydroxide, epoxide compounds obtained by reacting polyhalohydrin ethers, obtained by reacting polyhydric alcohols (F) containing at least one alicyclic ring with epihalohydrins (e) in the presence of catalytic amounts of acid catalysts such as boron trifluoride, with basic compounds such as sodium hydroxide, and epoxide compounds obtained by reacting polyhalohydrin ethers, obtained by reacting polyhydric alcohols (F) containing at least one alicyclic ring with epihalohydrins (e) in the presence of catalytic amounts of basic catalysts such as triethyl amine, with basic compounds such as sodium hydroxide.

Similarly such polyglycidyl ethers (A-1-1-3) include, for example, epoxide compounds containing, as the main reaction product, polyglycidyl ethers obtained by reacting polyhalohydrin ethers, obtained by reacting polyhydroxyl compounds (G) derived by the addition reaction of polyhydric alcohols (F) containing at least one alicyclic ring with alkylene oxides containing 2 to 4 carbon atoms, with epihalohydrins (e) in the presence of catalytic amounts of acid catalysts such as boron trifluoride, with basic compounds such as sodium hydroxide.

Preferred examples of polyglycidyl ether (A-1-1-3) are polyglycidyl ethers derived from polyhydric alcohols containing at least one alicyclic ring and polyglycidyl ethers derived by an addition reaction of polyhydric alcohols containing at least one alicyclic ring with an alkylene oxide containing 2 to 4 carbon atoms.

Said polyglycidyl ethers (A-1-1-3) can be prepared by the hydrogenation of aromatic rings of epoxide resins derived from polyhydric phenols containing at least one aromatic ring, such as polyglycidylethers of polyhydric phenols, to alicyclic rings, in which reaction usable catalysts are, for example, rhodium or ruthenium supported on a carrier, which are described in Japanese Patent Publication No. 42-7788 (7788/1967).

Said polyhydric alcohols containing at least one alicyclic ring (F) include polyhydric mononuclear alcohols containing one alicyclic ring (F-1), and polyhydric polynuclear alcohols containing at least two alicyclic rings (F-2).

Preferable polyhydric mononuclear alcohols (F-1) include dihydric mononuclear alcohols having the following formula (2):

wherein A represents a divalent cyclohexyl group which may be substituted by alkyl groups, such as methyl, n-propyl, n-butyl, n-hexyl, n-octyl and the like, preferably alkyl groups having a maximum of 4 carbon atoms, or halogen atom, i.e., chlorine, bromine, or fluorine, or alkoxy groups such as methoxy, methoxymethyl, ethoxy, ethoxyethyl, n-butoxy, amyloxy and the like, preferably an alkoxy group having a maximum of 4 carbon atoms, preferably nonsubstituted or substituted with halogen atoms, in view of properties of flame-resistance. $R_4$ and $R_5$, which can be the same or different, are alkylene groups such as methylene, n-propylene, n-butylene, n-hexylene, n-octylene and the like, preferably alkylene groups having a maximum of 6 carbon atoms; f and g, which can be the same or different, are 0 or 1, preferably 0.

Illustrative dihydric monocyclic alcohols having one cyclohexyl ring are, for example, substituted or nonsubstituted cyclohexanediols such as 1,4-cyclohexanediol, 2-methyl-1,4-cyclohexanediol, 2-chloro-1,4-cyclohexanediol, 1,3-cyclohexanediol, and the like, substituted or nonsubstituted dihydroxyalkyl-cyclohexane such as 1,4-dihydroxymethylcyclohexane, 1,4-dihydroxyethylcyclohexane. 1,3-dihydroxyethylcyclohexane, 1,4-dihydroxypropylcyclohexane, 1,4-dihydroxybutylcyclohexane and the like.

Further, polyhydric mononuclear alcohols having one alicyclic ring, except a cyclohexyl ring, can be substituted or nonsubstituted cycloalkylpolyols, such as 1,3-cyclopentanediol, 1,4-cycloheptanediol, 1,3-cycloheptanediol, 1,5-perhydronaphthalenediol, 1,3-dihydroxy-2,2,4,4-tetramethylcyclobutane, 2,6-dihydroxydecahydronaphthalene. 2,7-dihydroxydecahydronaphthalene and the like, and substituted or nonsubstituted polyhydroxyalkyl cycloalkanes such as 1,3-dihydroxymethylcyclopentane, 1,4-dihydroxymethylcycloheptane, 2,6-bis-(hydroxymethyl)-decahydronaphthalene, 2,7-bis(hydroxymethyl)-decahydronaphthalene, 1,5-bis-(hydroxymethyl)-decahydronaphthalene, 1,4-bid-(hydroxymeththyl)-decahydronaphthalene, 1,4-bis-(hydromethyl)-bicyclo[2,2,2]-octane and dimethyloltricyclodecane.

Particularly preferred, by reason of economy, as the polyhydric monocyclic alcohol is 1,4-dihydroxymethylcyclohexane.

Further, polyhydric polycyclic alcohols (F-2), for example, include polyhydric polycyclic alcohols having the following general formula (3):

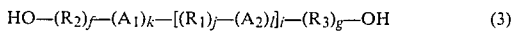

HO—(R$_2$)$_f$—(A$_1$)$_k$—[(R$_1$)$_j$—(A$_2$)$_i$]$_i$—(R$_3$)$_g$—OH  (3)

wherein: A$_1$ and A$_2$ are mono-ring or poly-ring divalent alicyclic hydrocarbon groups which may be substituted by alkyl groups, such as methyl, n-propyl, n-butyl, n-hexyl, n-octyl and the like (preferably alkyl groups having a maximum of 4 carbon atoms), or halogen atoms, i.e., chlorine, bromine, or fluorine, or alkoxy groups such as methoxy, methoxymethyl, ethoxy, ethoxyethyl, n-butoxy, amyloxy and the like (preferably alkoxy groups having a maximum of 4 carbon atoms), or may be unsubstituted, preferably, A$_1$ and A$_2$ are nonsubstituted or substituted by halogen atoms in view of properties of flame-resistance; k and l are 0 or 1, except that k and l are 0 to together; R$_1$ has the same significance as defined for the general formula (1), preferably methylene group, ethylene group or isopropylene group in view of properties of flame-resistance: j is 0 or 1; R$_2$ and R$_3$, which can be the same or different, are alkyl groups such as methyl, n-propyl, n-butyl, n-hexyl, n-octyl and the like, preferably alkyl groups having a maximum of 6 carbon atoms; f and g are 0 or 1, preferably 0, and i is an integer 0 or more than 0, preferably 0 or 1.

Particularly preferable polyhydric polycyclic alcohols (F-2) are dihydric polycyclic alcohols having the following general formula (3-1):

HO—A$_1$—(R$_1$)$_j$—A$_2$—OH  (3-1)

wherein: A$_1$, A$_2$, R$_1$ and j have the same significance as defined for the general formula (3).

Preferable examples of such dihydric polycyclic alcohols are substituted or nonsubstituted bicyclo alkanediols such as 4,4'-bicyclohexanediol, 3,3'-bicyclohexanediol, octachloro-4,4'-bicyclohexanediol and the like, or bis-(hydroxycycloalkyl)-alkanes such as 2,2-bis-(4-hydroxycyclohexyl)-propane, 2,4'-dihydroxydicyclohexylmethane, bis-(2-hydroxycyclohexyl)methane, bis-(4-hydroxycyclohexyl)-methane, bis-(4-hydroxy-2,6-dimethyl-3-methoxycyclohexyl)-methane, 1,1-bis-(4-hydroxycyclohexyl)-ethane, 1,1-bis-(4-hydroxycyclohexyl)-propane, 1,1-bis-(4-hydroxycyclohexyl)-butane, 1,1-bis-(4-hydroxycyclohexyl)-pentane, 2,2-bis-(4-hydroxycyclohexyl)-butane, 2,2-bis-(4-hydroxycyclohexyl)-pentane, 3,3-bis-(4-hydroxycyclohexyl)-pentane, 2,2-bis-(4-hydroxycyclohexyl)-heptane, bis-(4-hydroxycyclohexyl)-phenylmethane, bis-(4,4-hydroxycyclohexyl)-cyclohexylmethane, 1,2-bis-(4-hydroxycyclohexyl)-1,2-bis-(phenyl)-propane, 2,2-bis-(4-hydroxycyclohexyl)-1-phenylpropane, 2,2-bis-(4-hydroxy-3-methycyclohexyl)-propane, 2,2-bis-(4-hydroxy-2-methyl-cyclohexyl)-propane, 1,2-bis-(4-hydroxycyclohexyl)ethane, 1,1-bis-(4-hydroxy-2-chloro-cyclohexyl)ethane, 1,1-bis-(3,5-dimethyl-4-hydroxycyclohexyl)ethane, 1,3-bis-(3-methyl-4-hydroxycyclohexyl)propane, 2,2-bis-(3,5-dichloro-4-hydroxycyclohexyl)propane, 2,2-bis-(3-phenyl-4-hydroxycyclohexyl)propane, 2,2-bis-(3-isopropyl-4-hydroxycyclohexyl)-propane, 2,2-bis-(2-isopropyl-4-hydroxycyclohexyl)propane, 2,2-bis-(4-hydroxyperhydronaphthyl)propane, and the like, dihydroxycycloalkanes such as 4,4'-dihydroxydicyclohexane, 2,2-dihydroxybicyclohexane, 2,4-dihydroxybicyclohexane, and the like, di-(hydrocycloalkyl)-sulfones such as bis-(4-hydroxycyclohexyl)-sulfone, 2,4'-dihydroxydicyclohexylsulfone, 5-chloro-2,4-dihydroxydicyclohexylsulfone, 5-chloro-4,4'-dihydroxydicyclohexylsulfone, 3'-chloro-4,4'-dihydrocyclohexylsulfone and the like, di-(hydroxycycloalkyl)-ether such as bis-(4-hydroxycyclohexyl)ether, 4,3'-(or 4,2'-, 2,2'- or 2,3'-)dihydroxydicyclohexylether, 4,4'-dihydroxy-2,6-dimethyldicyclohexylether, bis-(4-hydroxy-3-isobutylcyclohexyl)ether, bis-(4-hydroxy-3-isopropylcyclohexyl)ether, bis-(4-hydro-3-chlorocyclohexyl)ether, bis-(4-hydroxy-3-fluorocyclohexyl)ether, bis-(4-hydroxy-3-bromocyclohexyl)-ether, bis-(4-hydroxy-perhydronaphthyl)ether, bis-(4-hydroxy-3-chloro-perhydronaphthyl)ether, bis-(2-hydroxybicyclohexyl)ether, 4,4'-dihydroxy-2,6-dimethoxydicyclohexylether, 4,4'-dihydroxy-2,5-diethoxydicyclohexylether, and the like, 1,1-bis-(4-hydroxycyclohexyl)-2-phenylethane, 1,3,3-trimethyl-1-(4-hydroxycyclohexyl)-6-hydroxyindane, 2,4-bis-(p-hydroxycyclohexyl)-4-methylpentane.

A preferable group of such dihydric polycyclic alcohols are compounds having the following general formula (3-2):

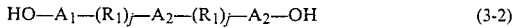

HO—A$_1$—(R$_1$)$_j$—A$_2$—(R$_1$)$_j$—A$_2$—OH  (3-2)

wherein: A$_1$, A$_2$, R$_1$ and j have the same significance as defined for the general formula (3) and two R$_1$, two j and two A$_2$ are the same or different from each other.

Examples of such dihydric polycyclic alcohols are 1,4-bis(4-hydroxycyclohexylmethyl)-cyclohexane, 1,4-bis-(4-hydroxy-cyclohexylmethyl)-tetramethylcyclohexane, 1,4-bis-(4-hydroxycyclohexylmethyl)-tetraethylcyclohexane, 1,4-bis-(p-hydroxycyclohexyl-isopropyl)-cyclohexane, 1,3-bis-(p-hydroxycyclohexyl-isopropyl)-cyclohexane and the like.

Another preferable group of such dihydric polyclic alcohols are the compounds having the following general formula (3-3):

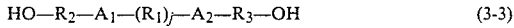

HO—R$_2$—A$_1$—(R$_1$)$_j$—A$_2$—R$_3$—OH  (3-3)

wherein: A$_1$, A$_2$, R$_1$, R$_2$, R$_3$, j have the same significance as defined for the general formula (3).

Examples of such dihydric polycyclic alcohols are substituted or nonsubstituted dihydroxyalkylbicycloalkanes, such as 4,4'-dihydroxymethylbicyclohexane, and substituted or unsubstituted bis(hydroxyalkylcycloalkyl)alkanes, such as 1,2-bis(4-hydroxymethylcyclohexyl)-ethane, 2,2-bis(4-hydroxymethylcyclohexyl)-propane, 2,3-bis(4-hydroxymethylcyclohexyl)butane, 2,3-dimethyl-2,3-bis-(4-hydroxymethylcyclohexyl)butane and the like.

The polyhydroxyl compound (G) here is a compound which is obtained by reacting the above-mentioned polyhydric alcohols (F) having at least one alicyclic ring with an alkylene oxide in the presence of such catalysts as will accelerate the reaction of the OH group and the epoxy group and which has atomic groups —ROH (wherein R is an alkylene group derived from an alkylene oxide) and/or —(RO)$_n$H (wherein R is an alkylene group derived from an alkylene oxide, such that one polyoxyalkylene chain may contain different alkylene groups, and n is an integer of 2 or more showing the polymerized number of oxyalkylene groups) bonded with said phenol residue by an ether bond. In this case, the ratio of alkylene oxide to said polyhydric alcohols (F) is made more than 1:1 (mol:mol). But, preferably, the ratio of the alkylene oxide to the OH group of said polyhydric alcohol (F) is 1 to 10:1 or particularly 1 to 3:1 by equivalents. Said alkylene oxides include, for example, ethylene oxide, propylene oxide and butylene oxide, and particularly preferred are those which will bring forth branched chains when producing ether linkages by their reaction with polyhydric phenols. Preferable examples thereof include propylene oxide and 2,3-butylene oxide, and a particularly preferable example thereof is propylene oxide.

A particularly preferable group among the polyhydroxyl compounds (G) is the compounds having the following general formula:

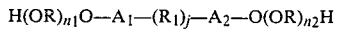

wherein: $A_1$, $A_2$, j and $R_1$ have the same significance as defined for the general formula (3-1), R is an alkylene group containing 2 to 4 carbon atoms, and $n_1$ and $n_2$ range from 1 to 3.

In addition, a preferable group among the polyhydroxyl compounds (G) is the compounds having the following general formula:

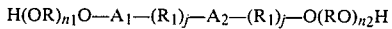

wherein: $A_1$, $A_2$, j and $R_1$ have the same significance as defined for the general formula (3-2), R is an alkylene group containing 2 to 4 carbon atoms, and $n_1$ and $n_2$ range from 1 to 3.

A particularly preferable group among the polyhydroxyl mono- or polynuclear alcohols (F) is alcohols having one or two cyclohexane-rings as an alicyclic ring, 2,2-bis-(4-hydroxycyclohexyl)propane.

The epihalohydrin (e) is represented by the following general formula (4):

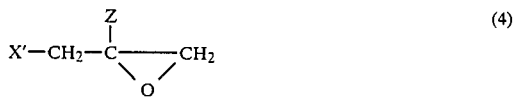

wherein Z represents a hydrogen atom, a methyl group or an ethyl group, and X' represents a halogen atom.

Examples of epihalohydrins (e) include, for example, epichlorohydrin, epibromohydrin, 1,2-epoxy-2-methyl-3-chloropropane, 1,2-epoxy-2-ethyl-3-chloropropane.

Examples of acid catalysts which can be used for accelerating the reaction of epihalohydrins (e) with polyhydric phenols (D), polyhydroxyl compounds (E), polyhydric alcohols (F) or polyhydroxyl compounds (G) include, for example, Lewis acids such as boron trifluoride, stannic chloride, zinc chloride and ferric chloride, active derivatives of Lewis acid such as boron trifluoride etherate and mixtures thereof.

Examples of basic catalysts which can be used for accelerating the reaction of epihalohydrins (e) with polyhydric phenols (D), polyhydric alcohols (F) or polyhydroxyl compounds (G) include, for example, alkali metal hydroxides such as sodium hydroxide, alkali metal alcoholates such as sodium ethylate, tetriary amines such as triethyl amine and triethanol amine, quaternary ammonium compounds such as tetramethylammonium bromide, and mixtures of them.

Examples of basic compounds which can be used for preparing glycidyl ethers at the same time as epihalohydrins (e) react with polyhydric phenols (D), polyhydric alcohols (F) or polyhydroxyl compounds (G), or for preparing glycidyl ethers by dehydrohalogenating halohydrin ethers obtained by reacting epihalohydrins (e) with polyhydric phenols (D) include, for example, alkali metal hydroxides such as sodium hydroxide, alkali metal aluminates such as sodium aluminate, and the like.

These catalysts or basic compounds can be used as they are or in the form of solutions in suitable inorganic and/or organic solvents.

The acid catalysts have a large catalytic effect among the catalysts which can be used for accelerating the reaction of epihalohydrins (e) with polyhydric phenols (D), polyhydroxyl compounds (E), polyhydric alcohols (F) or polyhydroxy compounds (G).

Further, polyglycidyl ethers obtained by the reaction of epihalohydrins and a mixture of the above-mentioned polyhydric alcohols, can be used as epoxy compounds of the present invention.

Examples of epoxidized poly-unsaturated compounds (A-1-1-4), include, for example, epoxidized polybutadiene (called oxiron), vinylcyclohexenedioxide, limonenedioxide, dicyclopentadienedioxide, bis(3,4-epoxycyclohexylmethyl)phthalate, diethyleneglycol-bis(3,4-epoxy-cyclohexene carboxylate), 3,4-epoxy-6-methylcyclohexylmethyl-3,4-epoxy-6-methylcyclohexane carboxylate, 3,4-epoxy-hexahydrobenzal-3,4 non-substituted 1,1-dimethanol and ethyleneglycol-bis(3,4-epoxy-tetrahydrodicyclopentadien-8-yl)-ether.

Further, well known epoxy resins which contain adjacent epoxy groups, for example, various epoxy resins disclosed in various literatures, such as "Production and Use of Epoxy Resins" (edited by Hiroshi Kakiuchi), published by Shokodo, Tokyo (1970), can be used.

Among these epoxy resins (A-1), preferred is a glycidyl ether having an epoxy equivalent of 180–1000.

The preferred examples of the polynuclear polyhydroxy phenols having adjacent hydroxy groups (A-2-1) used in the present invention are the condensation products of formaldehyde and the following polyhydroxy phenols having at least one adjacent hydroxy group. The preferred examples of the polyhydroxy phenols are catechol, catechol-3-carboxylic acid or its esters, catechol-4-carboxylic acid or its esters, pyrogallol, pyrogallol-4-carboxylic acid or its esters, pyrogallol-4,6-dicarboxylic acid or its esters, gallic acid or its esters, tannic acid or its esters, and urushiol.

When the above-mentioned polyhydroxy phenols are condensed with formaldehyde, other phenols such as phenol, cresol, hydroquinone, salicyclic acid etc. may be co-condensed.

The preferred examples of the polyol esters of the polyhydroxy phenolic carboxylic acids having adjacent hydroxy groups (A-2-2) are aliphatic polyol esters. The preferred examples of aliphatic polyols are diols such as ethylene glycol, propylene glycol, butylene glycol, 1,4-hexanediol, diethylene glycol, dipropyleneglycol, triethylene glycol, tripropylene glycol, etc., triols such as glycerin, trimethylol propane, etc., higher polyols such as pentaerythriol, sorbitol, glucose, etc.

The preferred examples of the polyhydroxy phenolic carboxylic acids are catechol-3-carboxylic acid, catechol-4-carboxylic acid, gallic acid, m-galloyl gallic acid, pyrogallol-4-carboxylic acid, pyrogallol-4,6-dicarboxylic acid and tannic acid.

The structure of the ester of glycerin and catechol-4-carboxylic acid, as an example, is as follows:

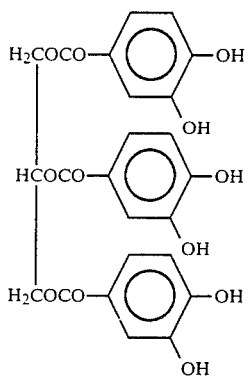

When a polycarboxylic compound is used, the esters can contain higher condensation products.

When the above-mentioned polyhydroxy phenols are condensed with polyols, other phenolic carboxylic acids such as salicyclic acid, p-hydroxy benzoic acid, etc. may be co-condensed.

The modified epoxy resin contains in one molecule thereof at least 0.05 mole, preferably 0.1 mole, of the polynuclear polyhydroxy phenols having adjacent hydroxy groups (A-2-1) and/or the polyol esters of the polyhydroxy phenolic carboxylic acids having adjacent hydroxy groups (A-2-2). Preferably, the average epoxide equivalent of the modified epoxy resin is less than 3,000.

The polyol resin (A) of the present invention is obtained by the reaction of the prepolymer and one or more compounds having amino group (A-3) such as primary amines or secondary amines. A preferable compound having amino group (A-3) include hydroxyamines having one or more hydroxy groups.

Examples of primary amines are methylamine, ethylamine, propylamine, etc. Examples of secondary amines are dibutylamine, etc. Examples of hydroxyamines are ethanolamine, propanolamine, diethanolamine, di-isopropanolamine, etc.

A reaction ratio of the compound having amino group (A-3) to the prepolymer is 1.1 to 0.7, preferably 1.0 to 0.9, in terms of an equivalent ratio of the group reactive with the epoxy group contained in (A-3) to the epoxy group contained in the prepolymer.

The reaction between the prepolymer and the compound having amino group (A-3) can be carried out without use of any catalyst at, for example, 60°–150° C.

The compound having more than one isocyanate groups or groups which change to isocyanate groups under the hardening condition (B) includes, for example, tolylene diisocyanate, xylylene diisocyanate, crude diphenyl methane diisocyanate, hexamethylene diisocyanate, an adduct of 3 moles tolylene diisocyanate and trimethylol propane and isocyanate group containing prepolymer obtained from above-mentioned compounds.

A ratio of the polyol resin (A) to the compound having more than one isocyanate groups or groups which change to isocyanate groups under the hardening condition (B) is 0.4 to 1.2, preferably 0.7 to 1.0, in terms of an equivalent ratio of the isocyanate group contained in (B) to the hydroxy group contained in (A). The bituminous material (C) to be used in the present invention includes coal tar, coal tar pitch, various cut-back tars, bojuntan and asphalt.

The substitutes of the bituminous material (C) to be used in the present invention include various materials, that is, aromatic oil resin, coumarone resin, petroleum resin, diluents such as dioctyl phthalate, dibutyl phthalate, and high boiling point neutral oil obtained from mineral oil, coal or the like.

A ratio of the bituminous material and/or its substitutes (C) to the polyol resin (A) is suitably 0.5 to 2 in terms of a weight ratio of (C) to (A).

In the coating composition of the present invention, other resins, diluents, solvents, colorants hardening catalysts, dehydrate agents, pigments, anticorrosive pigments, fillers and other additives can be contained, if necessary.

The coating composition can be cured under ambient conditions. However, it may cured under higher temperatures, if necessary.

In the following Examples the term "parts" means parts by weight.

PRODUCTION EXAMPLE 1

100 parts of diglycidyl ether of bisphenol-A (epoxide equivalent=450), 20 parts of the condensation products weight=450), 60 parts of xylene and 0.1 part of triethylamine are mixed and reacted at 120°–130° C. for 3 hours with agitation. Prepolymer (I) containing 65 weight % of solid content is obtained.

100 parts of prepolymer (I) and 12 parts of diethanol amine are mixed and reacted at 80° C. for 2 hours with agitation. Polyol resin (1) having a hydroxy group equivalent of 240 is obtained.

PRODUCTION EXAMPLE 2

150 parts of diglycidyl ether of bisphenol-F (epoxide equivalent is 380), 25 parts of glycerin triester of catechol-4-carboxylic acid (molecular weight is 500), 120 parts of xylene and 0.15 part of dimethyl benzylamine as a catalyst are mixed with one another and reacted at 130° C. for 3 hours with agitation. Prepolymer (II) containing 60 weight % of the solid is obtained.

100 parts of prepolymer (II) and 13 parts of dibutylamine are mixed with each other and reacted at 65° C. for 3 hours with agitation. Polyol resin (2) having a hydroxy group equivalent of 420 is obtained.

PRODUCTION EXAMPLE 3

150 parts of diglycidyl ether of bisphenol-A (epoxide equivalent=450), 50 parts of diglycidyl ether of propylene oxide adducts of bisphenol-A (epoxide equivalent=340), 35 parts of glucose ester of m-galloyl gallic acid, 160 parts of cellosolve acetate and 0.5 part of triethylamine as catalyst are mixed altogether and reacted at 120° C. for 4 hours. Prepolymer (III) containing 60 weight % of the solid is obtained.

100 parts of prepolymer (III) and 17 parts of diisopropanolamine are mixed with each other and reacted at 60° C. for 4 hours with agitation. Polyol resin (3) having a hydroxy group equivalent of 210 is obtained.

PRODUCTION EXAMPLE 4

100 parts of diglycidyl ether of bisphenol-A (epoxide equivalent is 450), 65 parts of xylene and 23 parts of diethanolamine are mixed altogether and reacted at 80° C. for 2 hours with agitation. Polyol resin (4) having a hydroxy group equivalent of 120 is obtained.

PRODUCTION EXAMPLE 5

100 parts of diglycidyl ether of bisphenol-A (epoxide equivalent is 380), 65 parts of xylene and 33 parts of dibutylamine are mixed altogether and reacted at 80° C. for 2 hours with agitation. Polyol resin (5) having a hydroxy group equivalent of 340 is obtained.

PRODUCTION EXAMPLE 6

150 parts of diglycidyl ether of bisphenol-A where epoxide equivalent is 450, 50 parts of diglycidyl ether of propylene oxide adducts of bisphenol-A where epoxide equivalent is 340, 120 parts of cellosolve acetate and 32 parts of diisopropanolamine are mixed altogether and reacted at 80° C. for 3 hours. Polyol resin (6) having a hydroxy group equivalent of 130 is obtained.

EXAMPLES 1–6 and COMPARATIVE EXAMPLES 1–6

Coating compositions are prepared, using the respective polyol resins (1)–(6) obtained in the above-mentioned PRODUCTION EXAMPLEs. Components of each composition are shown in Table 1 and 2.

Each coating composition is coated on a rusty steel plate of 150–200μ thickness. The steel plate has been exposed to the outdoor condition for 1 year and treated to remove the swelled rust to the grade of DSal of SIS. The coating is cured for 1 week under a room temperature. Results of the tests of the coating of the present invention in respect of adhesiveness and anticorrosive properties are better than the others as shown in Tables 1 and 2.

TABLE 1

| | Polyol resin/Bituminous system | | | | | |
|---|---|---|---|---|---|---|
| | Example 1 | Example 2 | Example 3 | Comparative Example 1 | Comparative Example 2 | Comparative Example 3 |
| Polyol resin (1) | 100 | | | | | |
| Polyol resin (2) | | 100 | | | | |
| Polyol resin (3) | | | 100 | | | |
| Polyol resin (4) | | | | 100 | | |
| Polyol resin (5) | | | | | 100 | |
| Polyol resin (6) | | | | | | 100 |
| Xylene | 50 | 50 | — | 50 | 50 | — |
| Cellosolve acetate | — | — | 50 | — | — | 50 |
| MIBK | 15 | 15 | 15 | 15 | 15 | 15 |
| Coal tar *1 | 50 | 50 | 50 | 50 | 50 | 50 |
| Talc | 50 | 50 | 50 | 50 | 50 | 50 |
| Silica *2 | 1 | 1 | 1 | 1 | 1 | 1 |
| Polyisocyanate *3 | 54 | 31 | 62 | 90 | 50 | 80 |
| Curing Condition | 7 days under room temperature | | | | | |
| Hardness (by pencil) *4 | B | HB | B | H | B | B |
| Adhesiveness | | | | | | |
| Adhesive Tape Test *4 (No/No) (Cross Cut) | 100/100 | 100/100 | 100/100 | 50/100 | 30/100 | 40/100 |
| Drawing Test *4 (No/No) (500 gr) | 10/10 | 10/10 | 10/10 | 4/10 | 5/10 | 5/10 |
| Flexibility *4 (6 mm Mandrel) | pass | pass | pass | Partially Peeled off | Partially Peeled off | Partially Peeled off |
| Anticorrosive Property | | | | | | |
| Salt Spray *5 Test (5% NaCl, 1500 hours) | pass | pass | pass | Swelled over all | Partially Swelled | Swelled over all |

*1: Tarkuron 280L (Trade name, made by Yoshida Oil K.K.)
*2: Aerosil (Trade name, made by Tokuyama Soda K.K.)
*3: Coronate L (Trade name, containing 13 weight % of isocyanate group, made by Nihon Polyurethane K.K.)
*4: JIS K-5400
*5: JIS K-2371

TABLE 2

| | Polyol resin/substitutes of bituminous material system | | | | | |
|---|---|---|---|---|---|---|
| | Example 4 | Example 5 | Example 6 | Comparative Example 4 | Comparative Example 5 | Comparative Example 6 |
| Polyol resin (1) | 100 | | | | | |
| Polyol resin (2) | | 100 | | | | |
| Polyol resin (3) | | | 100 | | | |
| Polyol resin (4) | | | | 100 | | |
| Polyol resin (5) | | | | | 100 | |
| Polyol resin (6) | | | | | | 100 |
| Xylene | 50 | 50 | — | 50 | 50 | — |
| Cellosolve acetate | — | — | 50 | — | — | 50 |
| MIBK | 15 | 15 | 15 | 15 | 15 | 15 |
| White tar *1 | 50 | 50 | 50 | 50 | 50 | 50 |
| Talc | 50 | 50 | 50 | 50 | 50 | 50 |
| Silica *2 | 1 | 1 | 1 | 1 | 1 | 1 |
| Polyisocyanate *3 | 23 | 12 | 25 | 40 | 15 | 40 |
| Curing condition | 7 days under room temperature | | | | | |

TABLE 2-continued

| | Polyol resin/substitutes of bituminous material system | | | | | |
|---|---|---|---|---|---|---|
| | Example 4 | Example 5 | Example 6 | Comparative Example 4 | Comparative Example 5 | Comparative Example 6 |
| Hardness (by pencil) | HB | HB | HB | 2H | 2H | HB |
| Adhesiveness | | | | | | |
| Adhesive Tape Test *4 (No./No.) (Cross cut) | 100/100 | 100/100 | 100/100 | 30/100 | 20/100 | 15/100 |
| Drawing Test *4 (No./No.) (500 gr) | 10/10 | 10/10 | 10/10 | 2/10 | 2/10 | 2/10 |
| Flexibility *4 (6 mm Mandrel) | pass | pass | pass | peeled off | peeled off | peeled off |
| Anticorrosive Property | | | | | | |
| Salt Spray *5 Test (5% NaCl, 600 hours) | pass | pass | pass | swelled over all | swelled over all | swelled over all |

*1: Sintaron 370 (Trade name, made by Tokyo Jushi Kogyo K.K.)
*2: Aerosil (Trade name, made by Tokuyama Soda K.K.)
*3: Millionate MR (Trade name, containing 30 weight % of isocyanate group, made by Nihon Polyurethane K.K.)
*4: JIS K-5400
*5: JIS K-2371

The embodiments of the invention in which an exclusive property or privilege is claimed are defined as follows:

1. A coating composition which comprises a mixture of
(A) a polyol resin obtained by the reaction of an amino compound having at least one primary or secondary amino group with a prepolymer containing epoxy groups which prepolymer has been prepared by reacting an epoxy resin, with
  a polyhydroxy phenolic compound selected from the group consisting of polynuclear polyhydroxy phenols having adjacent hydroxy groups, polyol esters of polyhydroxy phenolic carboxylic acids having adjacent hydroxy groups, and mixtures thereof,
  said prepolymer containing at least 0.05 mole of said polyhydroxy phenolic compound, per molecule, and having an average epoxide equivalent of less than 3000;
(B) a compound having more than one isocyanate group or groups which change to isocyanate groups under conditions effective for hardening the coating composition; and
(C) a material selected from the group consisting of coal tar, coal tar pitch, cut-back tar, bojuntan and asphalt, wherein the reaction ratio of said amino compound to said prepolymer, by equivalents of groups of said amino compound that are reactive with the epoxy groups of said prepolymer, is from 1.1 to 0.7; the ratio of (A) to (B), by equivalents of the hydroxy groups of (A) to the isocyanate groups of (B), is from 0.4 to 1.2; and the weight ratio of (C) to (A) is from 0.5 to 2.

2. A coating composition as claimed in claim 1, in which the reaction ratio of said amino compound to said prepolymer having epoxy groups is from 1.0 to 0.9 in terms of an quivalent ratio of the amino groups to the epoxy groups.

3. A coating composition as claimed in claim 1 in which the ratio of (A) to (B), in terms of the equivalent ratio of the isocyanate groups contained in (B) to the hydroxy groups contained in (A), is from 0.7 to 1.0.

4. A coating composition as claimed in claim 1 in which said polynuclear polyhydroxy phenol having adjacent hydroxy groups is a product of the condensation of formaldehyde with a polyhydroxy phenol selected from the group consisting of catechol, catechol-3-carboxylic acid and esters thereof, catechol-4-carboxylic acid and esters thereof, pyrogallol, pyrogallol-4-carboxylic acid and esters thereof, pyrogallol-4,6-dicarboxylic acid and esters thereof, gallic acid and esters thereof, tanninc acid and esters thereof, and urushiol.

5. A coating composition as claimed in claim 1 in which said polyol esters of polyhydroxy phenolic carboxylic acids having adjacent hydroxy groups are esters of aliphatic polyols with a polyhydroxy phenolic carboxylic acid selected from the group consisting of catechol-3-carboxylic acid, catechol-4-carboxylic acid, gallic acid, m-galloyl gallic acid, pyrogallol-4-carboxylic acid, pyrogallol-4,6-dicarboxylic acid and tannic acid.

6. A coating composition as claimed in claim 1 in which said amino compound is a primary or secondary amine.

7. A coating composition as claimed in claim 1 in which said amino compound is selected from the group consisting of methylamine, ethylamine, propylamine, dibutylamine, ethanolamine, propanolamine, diethanolamine and diisopropanolamine.

8. A coating composition as claimed in claim 1 in which (B) is selected from the group consisting of tolyene diisocyanate, xylylene diisocyanate, diphenyl methane diisocyanate, hexamethylene diisocyanate, an adduct of 3 moles of tolylene diisocyanate and trimethylol propane and a prepolymer obtained from the foregoing compounds and containing isocyanate group.

* * * * *